US006336367B1

(12) United States Patent
Räisänen

(10) Patent No.: US 6,336,367 B1
(45) Date of Patent: Jan. 8, 2002

(54) VIBRATION TRANSDUCER UNIT

(75) Inventor: Heikki Räisänen, Jyvaskyla (FI)

(73) Assignee: B-Band Oy, Vaajakoski (FI)

( * ) Notice: Subject to any disclaimer, the term of this patent is extended or adjusted under 35 U.S.C. 154(b) by 0 days.

(21) Appl. No.: 09/624,579

(22) PCT Filed: Jan. 29, 1999

(86) PCT No.: PCT/FI99/00062

§ 371 Date: Sep. 15, 2000

§ 102(e) Date: Sep. 15, 2000

(87) PCT Pub. No.: WO99/39543

PCT Pub. Date: Aug. 5, 1999

(30) Foreign Application Priority Data

Jan. 29, 1998 (FI) .................................................. 980202

(51) Int. Cl.[7] .................................................. G01N 29/00

(52) U.S. Cl. .............................. 73/632; 73/651; 73/662

(58) Field of Search .............................. 73/570, 862.23, 73/1.15, 708, 662, 651, 649, 632, 514.29, 514.36; 84/731, 733; 381/178, 191; 367/172

(56) References Cited

U.S. PATENT DOCUMENTS

| | | | | |
|---|---|---|---|---|
| 3,632,443 A | * | 1/1972 | Kodera | 307/400 |
| 4,258,332 A | * | 3/1981 | West | 330/297 |
| 4,429,190 A | | 1/1984 | Stockbridge | |
| 4,542,264 A | | 9/1985 | Schmidt et al. | |
| 4,654,546 A | | 3/1987 | Kirjavainen | |
| 4,657,114 A | | 4/1987 | Shaw | |
| 4,993,072 A | * | 2/1991 | Murphy | 381/103 |
| 5,123,325 A | | 6/1992 | Turner | |
| 5,319,153 A | | 6/1994 | Fishman | |
| 5,322,969 A | * | 6/1994 | Aaroe et al. | 84/731 |
| 5,329,498 A | * | 7/1994 | Greenstein | 367/155 |
| 5,507,171 A | * | 4/1996 | Mattes et al. | 73/1 B |
| 6,078,006 A | * | 6/2000 | Raisanen et al. | 84/733 |
| 6,276,212 B1 | * | 8/2001 | Cooper et al. | 73/632 |

FOREIGN PATENT DOCUMENTS

| | | | |
|---|---|---|---|
| DE | 3008391 | A1 | 9/1981 |
| DE | 3213819 | A1 | 10/1983 |
| DE | 4310793 | A1 | 10/1994 |
| EP | 0248528 | A3 | 12/1987 |
| GB | 1373840 | | 11/1974 |
| GB | 1397662 | | 6/1975 |
| GB | 1567408 | | 5/1980 |
| GB | 2203587 | A | 10/1988 |
| WO | WO 94/07342 | | 3/1994 |
| WO | WO 96/06718 | | 3/1996 |
| WO | WO 97/39602 | | 10/1997 |
| WO | WO 98/02869 | | 1/1998 |

* cited by examiner

*Primary Examiner*—Hezron Williams
*Assistant Examiner*—Jacques Saint-Surin
(74) *Attorney, Agent, or Firm*—Rosenman & Colin LLP

(57) ABSTRACT

Vibration transducer unit for converting vibrations to electric signals, in which unit there is a transducer part (11) and a signal processing part (14), like a preamplifier part. The transducer part (11) and the signal processing part (14) are integrated to a single structure.

7 Claims, 10 Drawing Sheets

VIBRATION TRANSDUCER UNIT

This invention relates to a vibration transducer unit according to the preamble of claim 1.

Vibration transducers can be used for example in saddle or bridge transducers for acoustic guitars, double bass and violin by means of which the vibrations of the strings are converted to electric signals. They are generally mounted under the saddle of the guitar or to the bridge of double bass and violin. They consist of a transducer part with electromechanical material such as elastic electret bubble film, piezoelectric crystals or polymers and electrically conductive electrode layers, as well as a connection cable, by means of which the signals are taken to a separate preamplifier.

In U.S. Pat. publication No. 5,319,153 a piezoelectric transducer for instruments is presented. Therein a strip-formed polyvinylidene fluoride (PVDF) film is used as an active electromechanical material. A connection cable is connected to the transducer part by soldering.

A drawback with vibration transducer units according to the prior art is their complicated structure and high price. When the preamplifier part and the transducer part are placed separately, a connection cable is needed between them. This causes extra costs and the connection cable often causes electrical interference especially if it has to be substantially long. If the electromechanical material used is film-like material, like PVDF rendered into piezoelectric, or elastic electret bubble film with permanent electric charge, the transducer must be very close the preamplifier. This is because this kind transducers have relatively low capacitance compared to standard cables capacitances. Additionally it is difficult to place a separate preamplifier in an electric guitar, double bass or violin. Furthermore, the transducer part and the preamplifier have to be protected by means of separate shields, in order to avoid mechanical damage and electrical interference.

The aim of the present invention is to remove the drawbacks of the prior art technique and to achieve a vibration transducer unit, which is small and compact, and by means of which additional interference can be avoided. In the solution according to the present invention the preamplifier and the transducer part are, according to the attended claims, integrated into one unit. A connection cable between the transducer part and the preamplifier is not needed. As a result a very compact unit is achieved including both mechanical and electrical protection of said unit.

Figure 1:
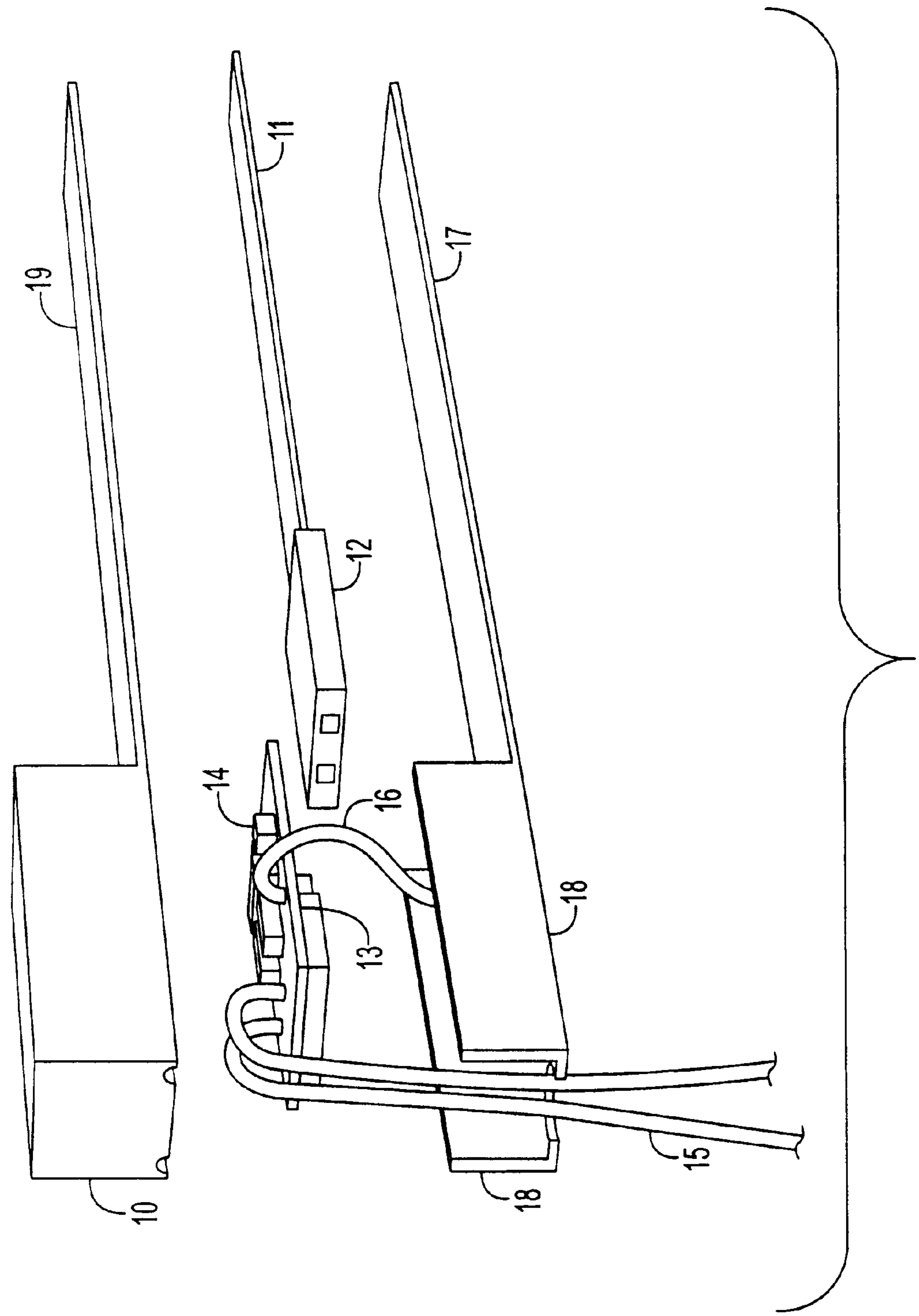
Figure 2A:
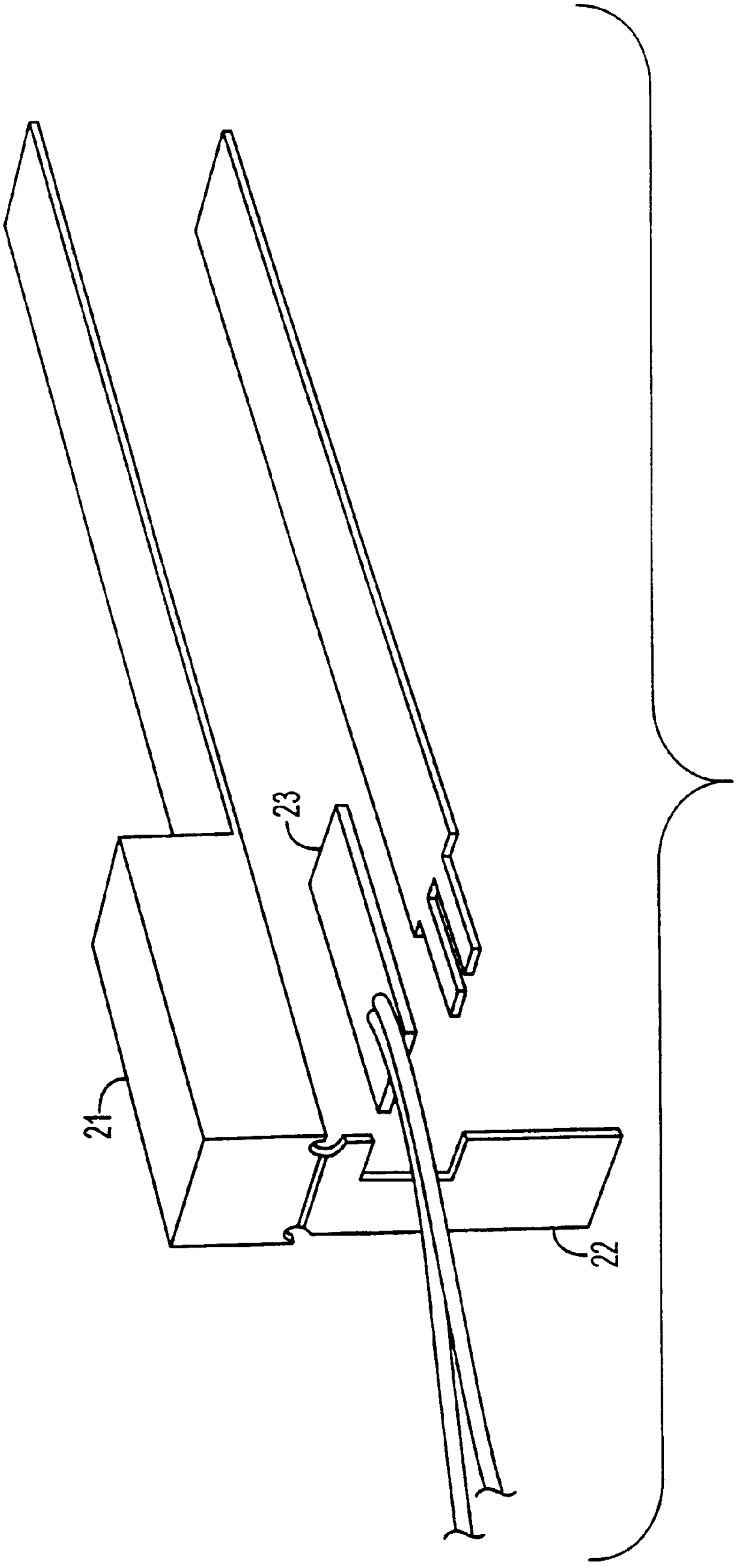
Figure 2B:
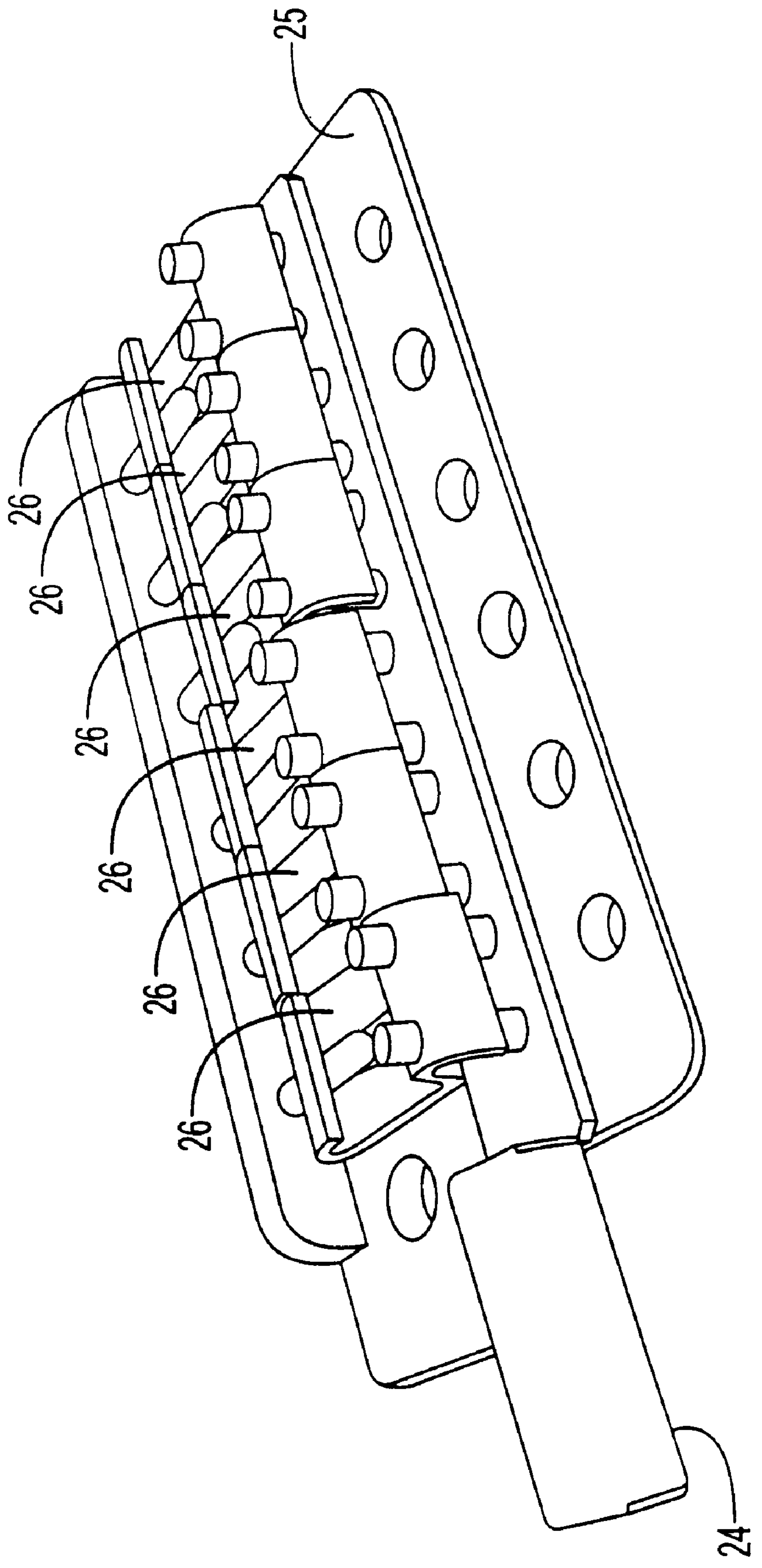
Figure 3:
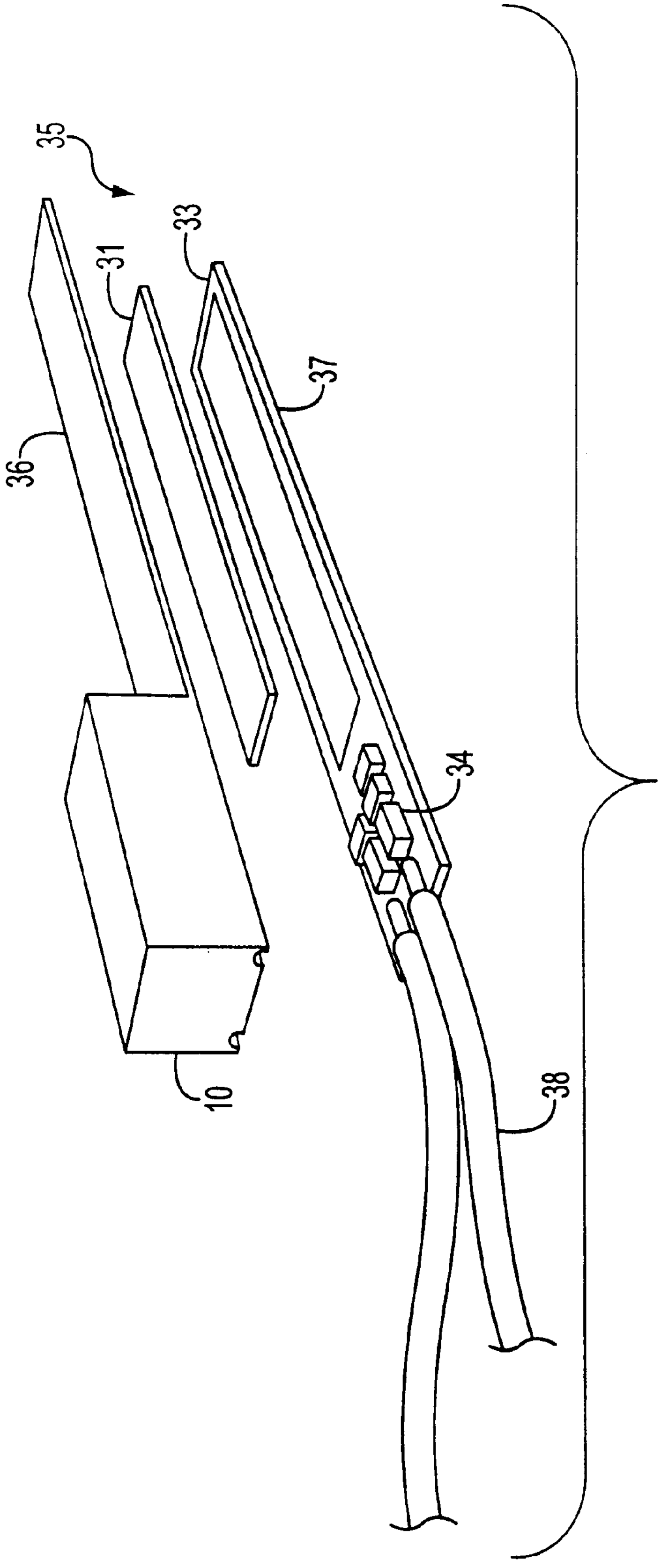
Figure 4:
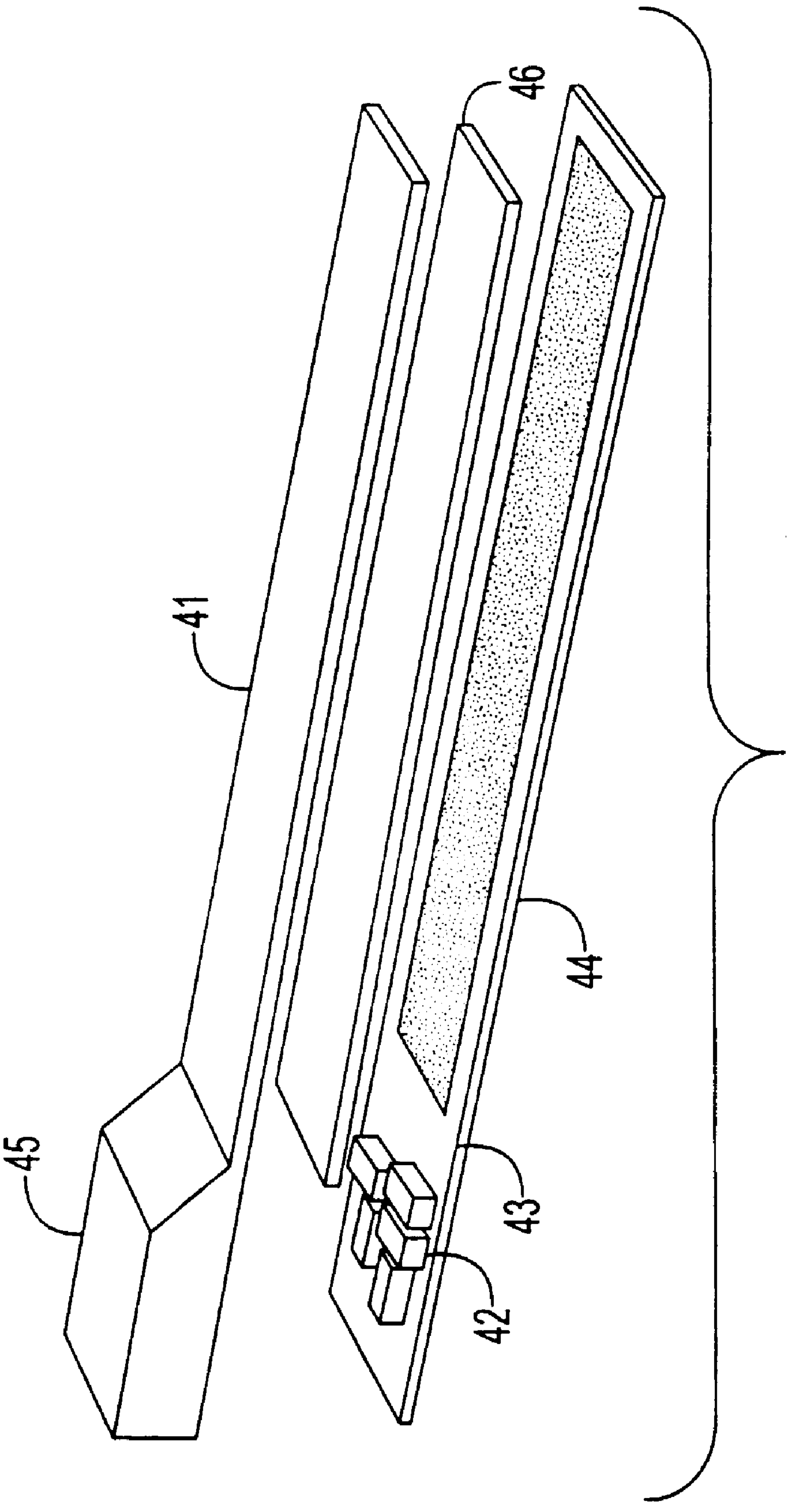
Figure 5A:
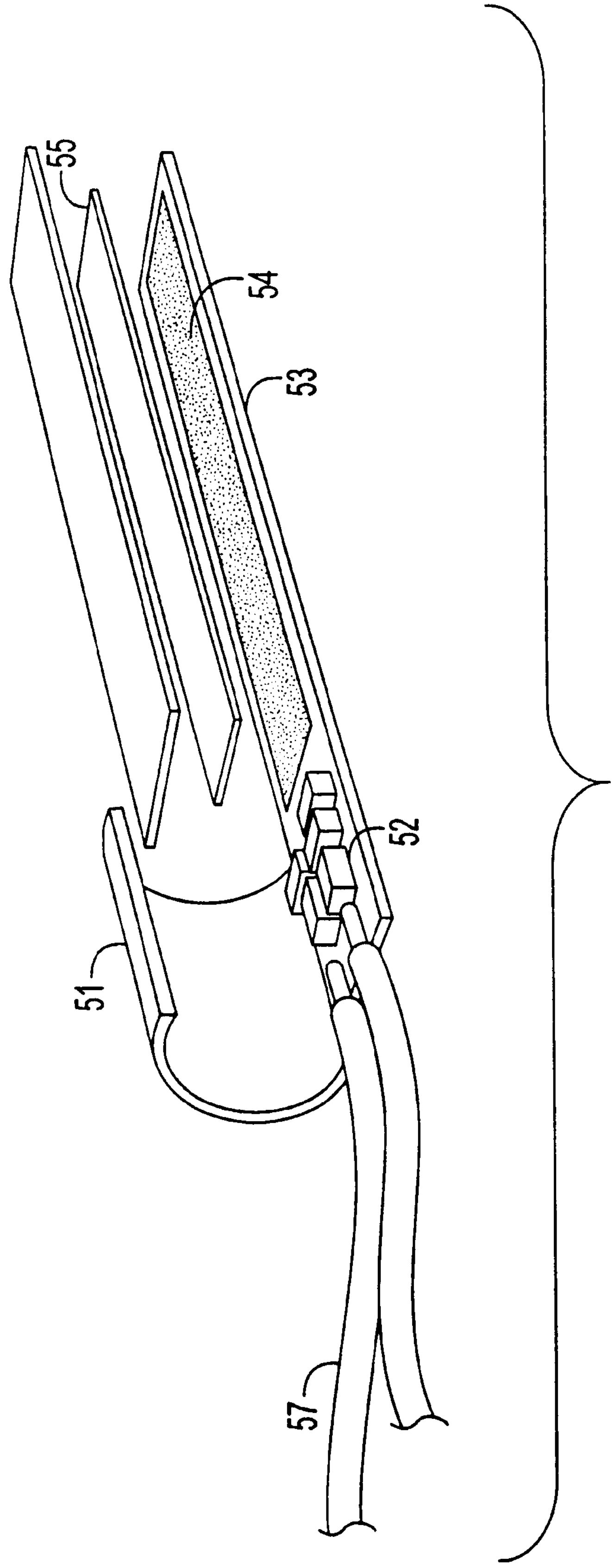
Figure 5B:
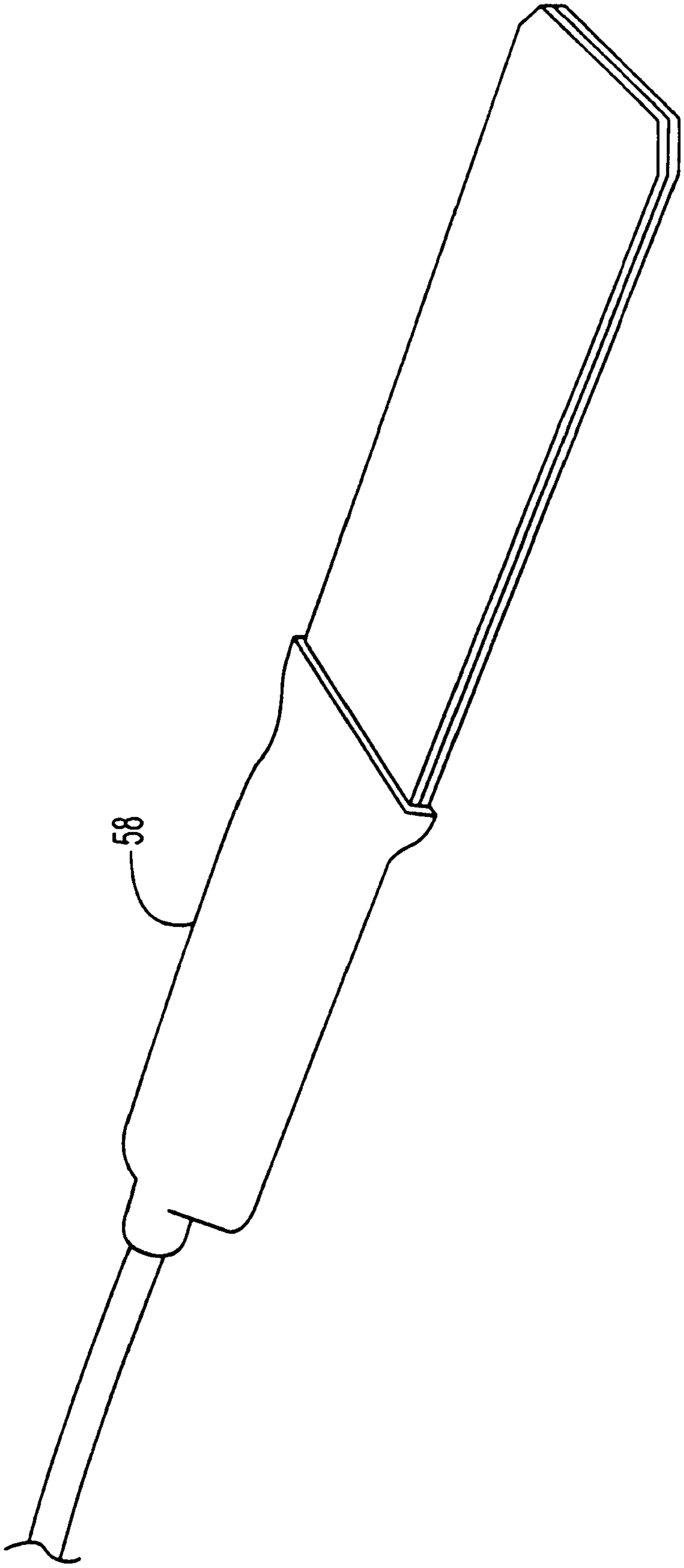
Figure 6A:
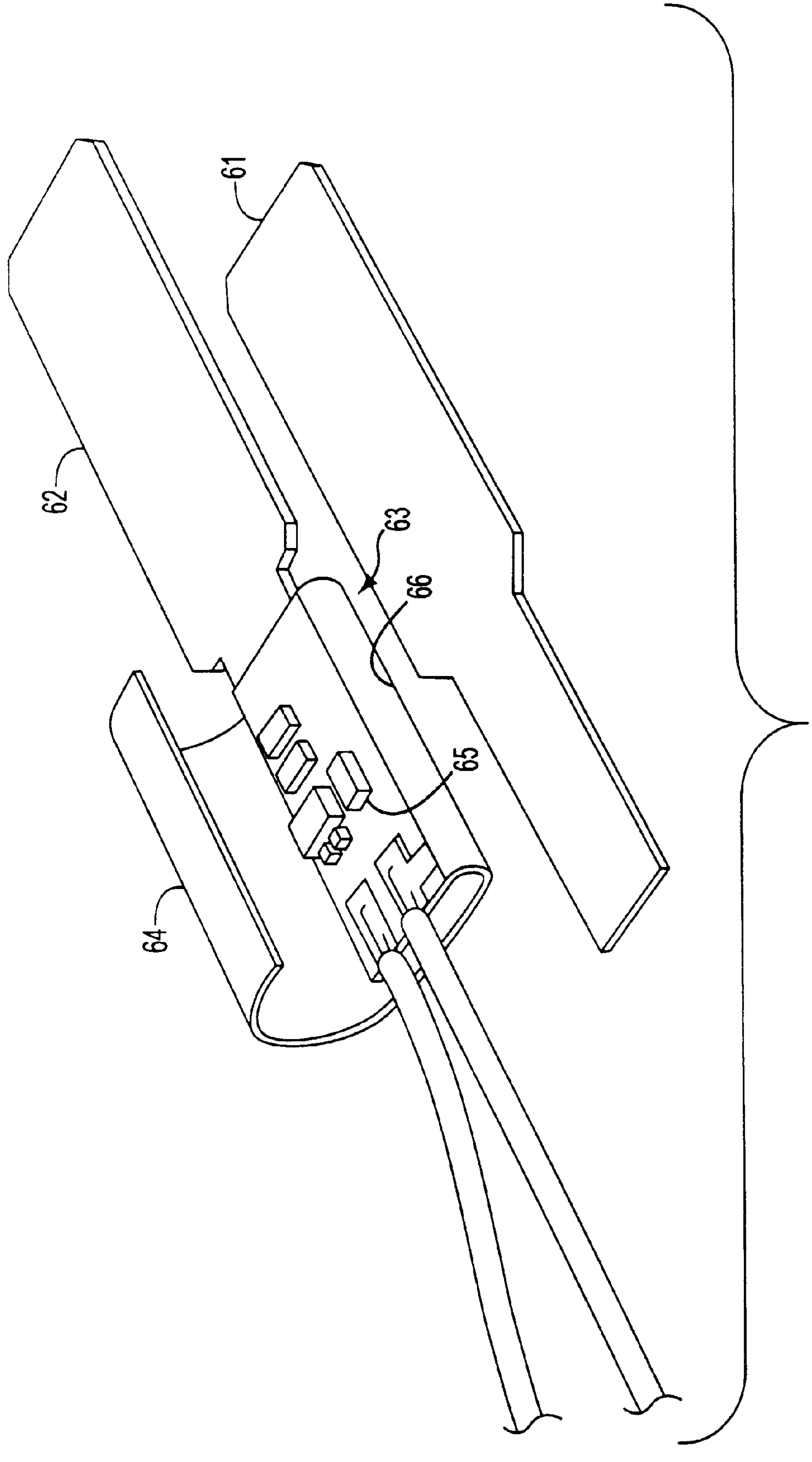
Figure 6B:
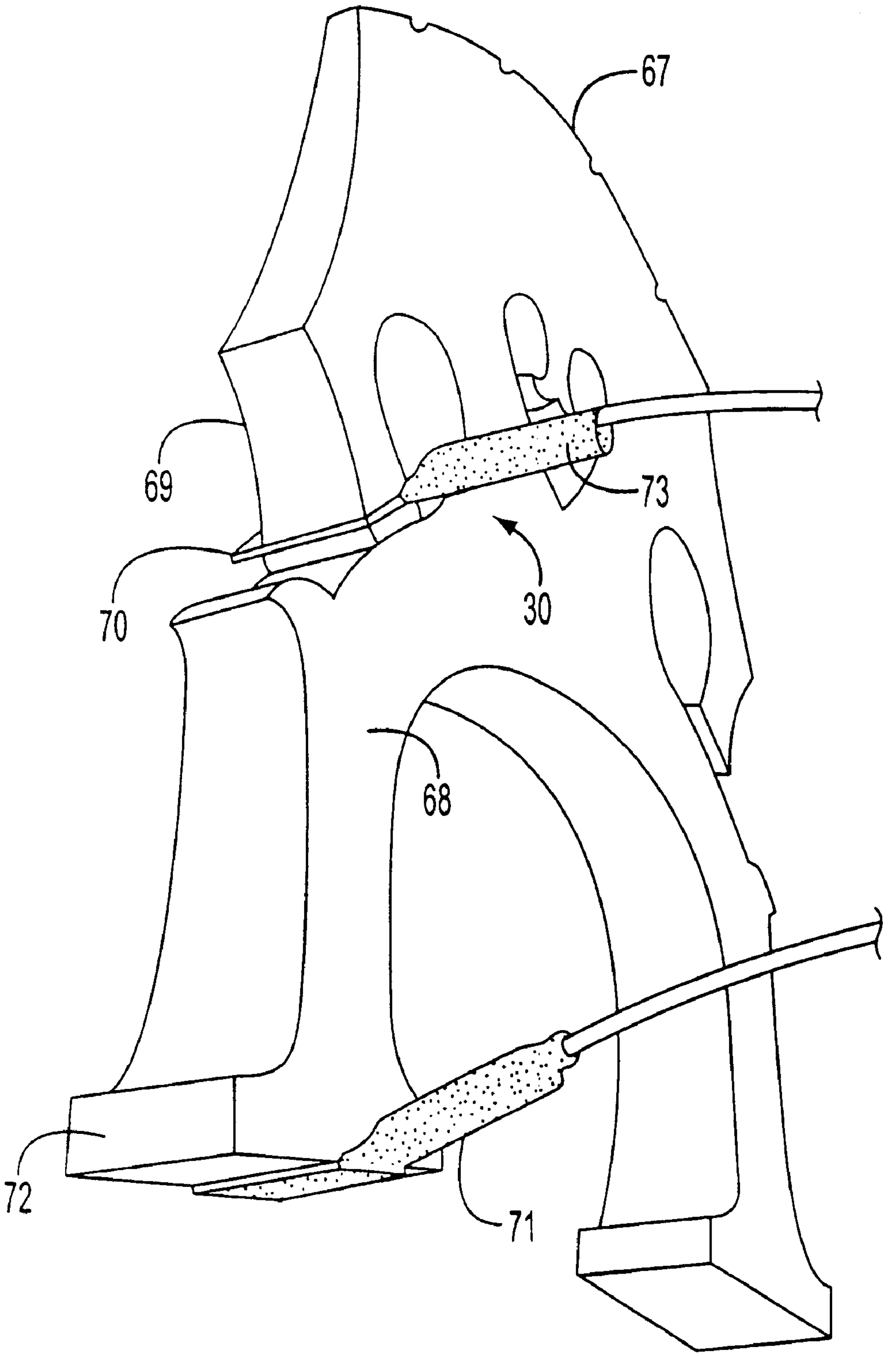
Figure 7:

In the following the invention is described in detail by the aid of examples, by referring to the attached set of drawings, wherein FIG. 1 presents an explosion picture of a vibration transducer unit according to the invention, FIG. 2*a* presents an explosion picture of one embodiment vibration transducer unit according to the invention, FIG. 2*b* presents an vibration transducer unit according to the invention placed in an electric guitar, FIG. 3 presents an explosion picture of one embodiment vibration transducer unit according to the invention, FIG. 4 presents an explosion picture of one embodiment vibration transducer unit according to the invention, FIG. 5*a* presents an explosion picture of one embodiment vibration transducer unit according to the invention, FIG. 5*b* presents a vibration transducer unit according to the invention with a heat-shrink tubing threaded on it, FIG. 6*a* presents an explosion picture of one embodiment vibration transducer unit according to the invention, FIG. 6*b* presents two vibration transducer units according to the invention placed on a double bass, and FIG. 7 presents a cross-section of an electret bubble film.

FIG. 1 presents a vibration transducer unit according to the present invention, with a strip-formed transducer part 11, and a connector 12 connected to the end of it. A suitable method for manufacturing such transducer element is described in the WO 97/39602. Connector 12 attaches the transducer part 11 to the circuit board 13 consisting preamplifier control circuitry 14 as well as two output conductors 15 and a ground conductor 16. The transducer 11, the connector 12 and the circuit board 13 have been protected with a metallic protection shield, said shield composed of both a bottom part 17 and top part 19 protecting the whole unit. The bottom part is composed of a plate 17, which is as wide as the transducer part 11 to which it is attached for example by gluing. It has side walls 18 substantially surrounding the connector 12. The shield consists of a plate 191 being as wide as the transducer part 11, significantly surrounding the space of the circuit board, said top part having a form of a bottomless rectangular box 10, which protects and shields the circuit board and the components on it, and inside which the walls 18 fit. The top and the bottom parts of the shield can be attached to each others for example by soldering. In this embodiment the output conductors 15 operate both as signal output conductors and power input conductors for the preamplifier. The ground conductor 16 is connected to either the top or the bottom part of the protection shield. It is to be noted that if one or both faces of the transducer are electrically conductive material and the glue in between it and the plate 19 and/or 17 is also electrically conductive, the ground conductor 16 is unnecessary. The transducer part 11 of the invention can be composed of for example one or more dielectric films laminated together, the material of which can be for example polyester. Necessary signal and ground electrodes can be arranged to form suitable shape on the surface of the films for example by silk-screen printing or etching. Between the signal and ground electrodes there is an active electromechanical film, for example being composed of one or several permanently charged dielectric electret films 74 containing flat lens-like gas bubbles 75 or blisters (so called electret bubble film, FIG. 7). Such film suitable as electromechanical material for a vibration transducer is presented in U.S. Pat. publication No. 4,654,546. In WO publication 96/06718 a method is presented, by means of which this kind of film can be swelled in order to form a swelled electret film with flat or teared gas blisters. Solid electret film or piezoelectric plastic film, such as PVDF, can also be used as the electromechanical material.

Referring now to the FIG. 2*a*, the protection shield can also be made in such a manner that the top part 21 has a strip 22, which can be bent to form the bottom part of the protection shield for the preamplifier and control circuitry 23. In this case the separate bottom plate 17 can be omitted. FIG. 2*b* shows a transducer unit 24 according to the invention, placed in connection with a bridge 25 and saddles 26 of an electric guitar.

One more transducer unit according to the invention is presented in FIG. 3. In this embodiment the transducer part 31 is integrated onto the same uniform, very thin (the thickness being for example 0,1 mm) circuit board 33 together with the preamplifier and control circuitry 34. In this embodiment the circuit board 33 is as long as the whole transducer unit. The connector 12 is not needed, and the structure becomes very thin, especially on the transducer part side. There is a metallized area 35 on the top side of the circuit board. This metallized area 35 operates as a signal contact for the transducer 31. The upper side of the transducer 31 is placed against protection shield 36, which is grounded. The protection shield 36 and the transducer 31 are glued together. The bottom side 37 of the circuit board 33 is metallized to provide the shield for the transducer. The bottom side 37 of the circuit board 33 is metallized at suitable areas to be enable the protection shield to be grounded directly to the circuit board 33 for example by soldering. Output conductors 38 are soldered to the circuit board 33.

In FIG. 4 one embodiment vibration transducer unit according to the invention is presented. In this embodiment a protection plate 41 is made of a strip-like metal plate. Said plate 41 is bent up as shown at one end of the structure, providing space for the preamplifier and control circuitry portion 42. The plate 41 connects to the electrical ground of the vibration transducer unit via suitable conductive, for example metallized, areas on the circuit board 43. The bent portion 45 of the plate 41 also forms the top part of the protective shield for the preamplifier and control circuitry portion 42. The bottom surface 44 of the circuit board 43 is metallized to provide the bottom part of the electrically protective shield for the preamplifier and control circuitry portion 42. In this embodiment, electrically protective shield for the preamplifier and control circuitry part 42 is solely formed by the bent portion 45 of the plate 41 and the metallized surface 44 of the circuit board 43, without any additional shield parts. A piece of heat shrink tubing or other suitable means can be placed over the end of the vibration transducer unit to provide better mechanical and moisture protection. In this embodiment the protective shield does not need to have separate parts for providing walls or bottom for the shield. Between the protective plate 41 and circuit board 43 there is the transducer element 46 and they all are glued together.

FIG. 5*a* shows another embodiment of the invention. There the protection shield 51 for the preamplifier circuitry 52 and the circuit board 53 are made of one piece of flexible, very thin circuit board material, such as Kapton®. The signal electrode 54 for the transducer element 55 is arranged on top side of the circuit board 53 and the transducer element 55 is glued on top of it. The bottom side of the circuit board 53 is metallized and it provides the electrical shield for .the signal electrode. On one end of the circuit board there are the components 56 of the circuitry and output conductors 57. The circuit board 53 has an extension 51, with metallized outer surface, which extension is wrapped around the circuitry 52 to provide the electrical shield. FIG. 5*b* shows how the extension 51 now completely wrapped around the circuitry 52, which can be covered with suitable heat-shrink tubing 58.

In FIG. 6*a* one embodiment vibration transducer unit according to the invention is presented. In this embodiment the metallic protection plate 61 provides mainly mechanical reinforcement for the transducer part 62. However, it is recommended that the metal plate 61 connects to the electrical ground of the vibration transducer part 62 via suitable conductive outer layer, made from for example graphite. The plate 61 can also be made of non conductive dielectric material such as polyester. Transducer part 62 is preferably made according to WO 97/39602, containing a transducer element, electrically conductive layers and conductive contacts being attached by crimping or by other suitable means. Said conductive contacts are soldered onto a flexible circuit board 63. The circuit board 63 is made wider to provide extension 64 at the preamplifier and control circuitry 65 end. In this embodiment, the circuit board 63 is made of very thin and flexible material such as Kapton®. The surface 66 of the circuit board 63 is metallized and it is wrapped around over the preamplifier and control circuitry portion 65 to provide protective shield for it. In this embodiment the electrically protective shield for the preamplifier and control circuitry portion 65 is solely formed by the circuit board 63, which enables very easy and costeffective manufacturing and assembly processes. The flexible protective shield 64, 66 can also be made of a separate piece of flexible conductive material, which is connected to the electrical ground of the preamplifier and control circuitry part 65 by suitable means. In this case a separate insulator, made of nonconductive material, is first wrapped around or threaded over the preamplifier and control circuitry part, and the protective shield is then wrapped around or threaded over the insulator. Referring to FIG. 6*b*, a piece of heat shrink tubing 73 or other suitable means can be placed over the end of the vibration transducer unit to provide better mechanical protection and neater outlook. In FIG. 6*b*, a vibration transducer unit according to the invention has been placed on the bridge 67 of a double bass, in a slot formed by a curved body part 68 and an end of a wing part 69, close to the body part 68. The transducer is secured in the middle of the slot by wedge a 70 made from for example wood. Additionally, a second vibration transducer unit 71 according to the invention is placed under the bridge foot 72, between the bridge and the top plate (sound board) of the instrument. A similar transducer unit or set of multiple transducer units can also be placed on some other stringed instruments, for example cello or violin, by similar means.

It is obvious for a skilled person in the art, that the embodiments of the invention are not solely restricted to the examples presented above, but they can be varied within the scope of the claims presented hereafter. Thus the vibration transducer unit according to the invention can also be used for example in other stringed instruments, as for example in pianos or grand pianos, in order to convert vibrations into electric signals. Embodiments of the transducer unit according to the invention can also be used in other than musical instrument applications, actually in all applications in which mechanical vibrations are converted to electrical signals. Embodiments of the transducer unit according to the invention can be used for converting vibrations to electrical signals between any two or more separate vibrating objects, or inside any slot within any vibrating object, or even for measuring vibrations from any vibrating surface if an object having suitable mass is attached to the opposite surface of the transducer unit. Additionally, embodiments of said transducer unit can be used for converting vibrations below or above the audible range in frequency (infra-sonic and ultrasonic, respectively) to electrical signals.

What is claimed is:

1. A vibration transducer unit for converting vibrations to electric signals, comprising:

a transducer part and a signal processing part integrated to a single structure, said signal processing part attached to an end of said transducer part, and a protection shield defined by a first protection part for shielding the transducer part and a second protection part for shielding the signal processing part, said first protection part further comprising a plate-like part and second protection part further comprising a box-like part, wherein said protection shield further comprises a cover part and a bottom part, said cover part defined by an integrated combination of an upper portion of said first protection part and an upper portion of second protection part, said bottom part defined by an integrated combination of a lower portion of said first protection part and a lower portion of second protection part, said cover part and said bottom part being joined together to shield said transducer part and said signal processing part.

2. A vibration transducer unit in accordance with claim 1, wherein said signal processing part further comprises signal outputs, and wherein said second protection part further comprises an opening for passage of said signal outputs through said protection shield.

3. A vibration transducer unit in accordance with claim 2, wherein said opening is defined in said bottom part.

4. A vibration transducer unit for converting vibrations to electric signals, comprising:

a flexible, thin circuit board, a signal processing part integrated with said circuit board, a transducer part integrated with said circuit board and said signal processing part to form a single structure, an upper protection shield defined by a first protection part for shielding the transducer part and a second protection part for shielding the signal processing part, and a lower protection shield defined by a metallized area on said circuit board for shielding said transducer part and said signal processing part.

5. A vibration transducer unit in accordance with claim 4, wherein a part of the circuit board is wrapped around said signal processing part.

6. A vibration transducer unit in accordance with claim 5, wherein said first protection part is defined by said part of said circuit board that is wrapped around said signal processing part.

7. A vibration transducer unit for converting vibrations to electric signals, comprising:

a transducer part having an active electromechanic element, a signal processing part integrated with said transducer part to a single structure, a protection shield defined by a first protection part for shielding the transducer part and a second protection part for shielding the signal processing part, said transducer part further comprising signal electrodes and ground electrodes, at least one dielectric electret film having gas bubbles applied between said signal and said ground electrodes and forming the active electromechanic element of said transducer part.

* * * * *